(12) United States Patent
Lo et al.

(10) Patent No.: US 12,450,496 B1
(45) Date of Patent: Oct. 21, 2025

(54) SYSTEMS AND METHODS FOR CLASSIFYING STRINGS OF ARBITRARY LENGTH IN A LARGE NUMBER OF CLASSES

(71) Applicant: Broadridge Financial Solutions, Inc., Newark, NJ (US)

(72) Inventors: Joseph Lo, Newark, NJ (US); Jaiden Fallo, Newark, NJ (US); Nicholas Aronow, Newark, NJ (US)

(73) Assignee: Broadridge Financial Solutions, Inc., Newark, NJ (US)

( * ) Notice: Subject to any disclaimer, the term of this patent is extended or adjusted under 35 U.S.C. 154(b) by 0 days.

(21) Appl. No.: 18/904,741

(22) Filed: Oct. 2, 2024

(51) Int. Cl.
*G06N 3/096* (2023.01)
*G06F 16/35* (2019.01)
*G06F 16/93* (2019.01)
*G06N 3/045* (2023.01)

(52) U.S. Cl.
CPC ............ *G06N 3/096* (2023.01); *G06F 16/35* (2019.01); *G06F 16/93* (2019.01); *G06N 3/045* (2023.01)

(58) Field of Classification Search
CPC ........ G06N 3/096; G06N 3/045; G06F 16/93; G06F 16/35
See application file for complete search history.

(56) References Cited

U.S. PATENT DOCUMENTS

2022/0138403 A1* 5/2022 Goodman ................ G06N 3/08
715/234
2023/0082729 A1* 3/2023 Religa ..................... G06N 3/045
715/230

* cited by examiner

*Primary Examiner* — Hau H Hoang
(74) *Attorney, Agent, or Firm* — GREENBERG TRAURIG, LLP (57) ABSTRACT

The present disclosure includes gathering a tagged document of a type, collecting a repository of tags pertaining to the predetermined type of document, providing the tagged document and the repository of tags to train a first pre-trained LLM, identifying a first tag in the gathered document, pairing one text with the first tag, identifying one value associated with the paired first tag and the text, formatting the paired first tag and the text and the associated value to form a training message to train a second pre-trained LLM, providing an unseen document of the type to the first trained LLM, generating, via executing the first trained LLM, a second tag from the unseen document, providing the second tag and the unseen document to the second trained LLM, and identifying, via executing the second trained LLM, an unseen text paired with the second tag and an associated value.

19 Claims, 6 Drawing Sheets

SYSTEMS AND METHODS FOR CLASSIFYING STRINGS OF ARBITRARY LENGTH IN A LARGE NUMBER OF CLASSES

FIELD OF TECHNOLOGY

The present disclosure generally relates to systems and methods for document analysis by classifying strings of arbitrary length in a large number of classes.

BACKGROUND OF TECHNOLOGY

XBRL tags are used extensively in financial reporting to enhance the accuracy, transparency, and accessibility of financial data. Typically, XBRL tags standardize financial data, making it easier to compare across different companies and jurisdictions. Each tag corresponds to a specific financial item, such as revenue or expenses, ensuring consistency. Typically, with XBRL, every piece of financial data is tagged with its context, such as the reporting period or the currency used. This provides a clearer picture of a company's financial health and operations. Many regulatory bodies, like the SEC in the United States, require companies to file their financial statements in XBRL format.

SUMMARY OF DESCRIBED SUBJECT MATTER

In some aspects, the techniques described herein relate to a method, including: training, by at least one computing device, a first and a second pre-trained large language model (LLM), the training including: gathering, by the at least one computing device, at least one tagged document of a predetermined type; dividing, by the at least one computing device, the gathered tagged documents to one or more chunks of texts of a first predetermined size; collecting, by the at least one computing device, a repository of tags pertaining to the predetermined type of document; providing, by the at least one computing device, the at least one tagged document and the repository of tags to train the first pre-trained LLM; identifying, by the at least one computing device, at least a first tag in the gathered document; pairing, by the at least one computing device, at least one text, among the one or more chunks of texts, with the identified first tag; identifying, by the at least one computing device, at least one value associated with the paired first tag and the at least one text from context information of the paired at least one text; formatting, by the at least one computing device, the paired first tag and the at least one text and the associated at least one value to form at least one training message; generating, by the at least one computing device, at least one dataset containing the at least one training message; providing, by the at least one computing device, the at least one dataset to train the second pre-trained LLM; evaluating, by the at least one computing device, at least one training result of the first and second pre-trained LLM; and changing, by the at least one computing device, a size of chucks of texts to a second predetermined size in response to a result of evaluating the training of the first and second pre-trained LLM; iterating, by the at least one computing device, the training of the first and second pre-trained LLM with the second predetermined size to obtain a first and second trained LLM; providing, by the at least one computing device, an unseen document of the predetermined type to the first trained LLM; generating, by the at least one computing device via executing the first trained LLM, a list of tags from the unseen document; selecting, by the at least one computing device, at least a second tag from the list of tags; providing, by the at least one computing device, the second tag and the unseen document to the second trained LLM; and identifying, by the at least one computing device via executing the second trained LLM, at least one unseen text paired with the second tag and a value associated with the paired second tag and the at least one unseen text.

In some aspects, the techniques described herein relate to a method, wherein the predetermined type is a financial report.

In some aspects, the techniques described herein relate to a method, wherein the repository of tags is at least a part of extensible business reporting language (XBRL) tags.

In some aspects, the techniques described herein relate to a method, wherein the first and second pre-trained LLM reside in a cloud computing system.

In some aspects, the techniques described herein relate to a method, wherein the at least one dataset is transmitted to the cloud computing system from a local computing system via internet.

In some aspects, the techniques described herein relate to a method, wherein the second predetermined size is larger than the first predetermined size.

In some aspects, the techniques described herein relate to a method, further including adjusting, by the at least one computing device, weights of the first and second pre-trained LLM to optimize handling of the predetermined document type.

In some aspects, the techniques described herein relate to a method, wherein the paired at least one text contains at least a third tag.

In some aspects, the techniques described herein relate to a method, further including outputting, by the at least one computing device, the paired second tag and the at least one unseen text in a dictionary form.

In some aspects, the techniques described herein relate to a method, including: training, by at least one computing device, a first and a second pre-trained large language model (LLM), the training including: gathering, by the at least one computing device, at least one tagged document of a predetermined type; dividing, by the at least one computing device, the gathered tagged documents to one or more chunks of texts of a first predetermined size; collecting, by the at least one computing device, a repository of tags pertaining to the predetermined type of document; providing, by the at least one computing device, the at least one tagged document and the repository of tags to train the first pre-trained LLM; identifying, by the at least one computing device, at least a first tag in the gathered document; pairing, by the at least one computing device, at least one text, among the one or more chunks of texts, with the identified first tag; identifying, by the at least one computing device, at least one value associated with the paired first tag and the at least one text from context information of the paired at least one text; formatting, by the at least one computing device, the paired first tag and the at least one text and the associated at least one value to form at least one training message; generating, by the at least one computing device, at least one dataset containing the at least one training message; providing, by the at least one computing device, the at least one dataset to train the second pre-trained LLM; evaluating, by the at least one computing device, at least one training result of the first and second pre-trained LLM; and changing, by the at least one computing device, a size of chucks of texts to a second predetermined size in response to a result of evaluating the training of the first and second pre-trained LLM; iterating, by the at least one computing device, the training of the first and second pre-trained LLM with the second predetermined size to obtain a first and second trained LLM; providing, by the at least one computing device, an unseen document of the predetermined type to the first trained LLM; generating, by the at least one computing device via executing the first trained LLM, a list of tags from the unseen document; selecting, by the at least one computing device, at least a second tag from the list of tags; providing, by the at least one computing device, the second tag and the unseen document to the second trained LLM; identifying, by the at least one computing device via executing the second trained LLM, at least one unseen text paired with the second tag and a value associated with the paired second tag and the at least one unseen text; and outputting, by the at least one computing device, the paired second tag and the at least one unseen text in a dictionary form.

In some aspects, the techniques described herein relate to a method, wherein the predetermined type is a financial report.

In some aspects, the techniques described herein relate to a method, wherein the repository of tags is at least a part of extensible business reporting language (XBRL) tags.

In some aspects, the techniques described herein relate to a method, wherein the first and second pre-trained LLM reside in a cloud computing system.

In some aspects, the techniques described herein relate to a method, wherein the at least one dataset is transmitted to the cloud computing system from a local computing system via internet.

In some aspects, the techniques described herein relate to a method, wherein the second predetermined size is larger than the first predetermined size.

In some aspects, the techniques described herein relate to a method, further including adjusting, by the at least one computing device, weights of the first and second pre-trained LLM to optimize handling of the predetermined document type.

In some aspects, the techniques described herein relate to a method, wherein the paired at least one text contains at least a third tag.

In some aspects, the techniques described herein relate to a system including: one or more processors; and a memory in communication with the one or more processors and storing instructions that, when executed by the one or more processors, cause the one or more processors to: train a first and a second pre-trained large language model (LLM), the training including: gathering at least one tagged document of a predetermined type; dividing the gathered tagged documents to one or more chunks of texts of a first predetermined size; collecting a repository of tags pertaining to the predetermined type of document; providing the at least one tagged document and the repository of tags to train the first pre-trained LLM; identifying at least a first tag in the gathered document; pairing at least one text, among the one or more chunks of texts, with the identified first tag; identifying at least one value associated with the paired first tag and the at least one text from context information of the paired at least one text; formatting the paired first tag and the at least one text and the associated at least one value to form at least one training message; generating at least one dataset containing the at least one training message; providing the at least one dataset to train the second pre-trained LLM; evaluating at least one training result of the first and second pre-trained LLM; and changing a size of chucks of texts to a second predetermined size in response to a result of evaluating the training of the first and second pre-trained LLM; iterate the training of the first and second pre-trained LLM with the second predetermined size to obtain a first and second trained LLM; provide an unseen document of the predetermined type to the first trained LLM; generate, via executing the first trained LLM, a list of tags from the unseen document; select at least a second tag from the list of tags; provide the second tag and the unseen document to the second trained LLM; and identify, via executing the second trained LLM, at least one unseen text paired with the second tag and a value associated with the paired second tag and the at least one unseen text.

In some aspects, the techniques described herein relate to a system, wherein the first and second pre-trained LLM reside in a cloud computing system.

In some aspects, the techniques described herein relate to a system, wherein the at least one dataset is transmitted to the cloud computing system from a local computing system via internet.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

The present disclosure describes a computer-based method for classifying input strings (documents or texts) of arbitrary length with "tags" to help AI models to better understand the documents.

The term, "classifying input strings", as used herein generally refers to a process of assigning predefined labels or categories to input strings based on certain characteristics or patterns. Essentially, it is about organizing and categorizing text data into meaningful groups. For example, text classification may involve assigning topics or sentiments to text documents (e.g., spam detection, sentiment analysis, news categorization). As another example, named entity recognition (NER) may involve identifying specific entities (such as names, dates, locations) within a text.

The term, "tag", as used herein generally refers to a simple piece of data, usually no more than one to three words, that describe information on a document, web page, or another digital file. The tag provides details about an item and make it easy to locate related items that have the same tag. In general, tags are used to categorize, organize, and facilitate the search of documents. Tags can be particularly useful in large databases or content management systems where finding information quickly is important.

The presently disclosed method can be employed for data tagging of specific documents such as SEC filings (10K, 10Q), but also has the flexibility to be applied to any type of document.

In some embodiments, an exemplary computer-based method, according to principles of one or more embodiments detailed below, includes:

Creating a data extraction pipeline to extract training data from previously tagged documents.

Fine tuning a model of tags and text, e.g., taking a pre-trained model and adjusting it to better understand and generate tags for specific documents or texts, such as SEC filings. A pretrained model that has been pre-trained on a large and diverse dataset may already have learned features and representations that can serve as a starting point. The fine tuning process may involve modifying the last layer(s) of the pre-trained model or add new layers on top of it. The weights of the initial layers of the pre-trained model may be frozen so that they remain the same during training. This is done to avoid destroying any of the information that the pre-trained model contains during future training rounds. Then the fine tuning process trains the new layers with new dataset. In some embodiments, the entire re-trained model may be unfrozen, and re-trained on the new data with a very low learning rate. The fine tuning process may potentially achieve meaningful improvements, by incrementally adapting the pre-trained features to the new data.

Fine tuning a model of the classes that are available, e.g., taking a pre-trained model and adjusting it to better understand and classify instances into one of the available classes. In machine learning, a class as used herein generally refers to one of the possible labels that can be applied to a given input. A model of the classes, which may be referred to as a Class Diagram, is a type of static structure diagram in the Unified Modeling Language (UML) that describes the structure of a system. The class diagram shows the system's classes, their attributes, operations (or methods), and the relationships among objects. A class diagram may have following main components:

a. Class name: the name of the class is typically written in the top compartment of the class box and may be centered and bold.

b. Attributes: also known as properties or fields, attributes represent the data members of the class. The attributes are listed in the second compartment of the class box and often include the visibility (e.g., public, private) and the data type of each attribute.

c. Methods: also known as functions or operations, methods represent the behavior or functionality of the class. The Methods are listed in the third compartment of the class box and include the visibility (e.g., public, private), return type, and parameters of each method.

d. Visibility notation: visibility notations indicate the access level of attributes and methods. Common visibility notations include: + for public (visible to all classes), − for private (visible only within the class), #for protected (visible to subclasses), ~ for package or default visibility (visible to classes in the same package).

e. Relationships: lines connecting classes illustrate associations, showing relationships such as one-to-one or one-to-many.

A run time hierarchy of the expected classes based on other classes. For example, a class can inherit properties and methods from another class, and this relationship can be used to organize classes into a hierarchy during the execution of the program. The term, "run time hierarchy" as used herein generally refers to the organization or structure of classes (categories) during program execution. It dynamically represents relationships between classes, often based on specific conditions or interactions. Unlike a static hierarchy defined at design time, a run time hierarchy adapts as the program runs. The term, "expected classes", as used herein generally refers to classes that the program anticipates encountering during execution. For example, in a natural language processing (NLP) system, expected classes may include "positive sentiment," "negative sentiment," and "neutral sentiment." The run time hierarchy can be influenced by existing classes or their behavior. For instance, if an NLP system encounters positive sentiment, it may dynamically create a subcategory for "very positive sentiment" based on the context.

Feeding an SEC (Securities and Exchange Commission) filing to an artificial intelligence (AI) machine, such as Word2Vec, ChatGPT among other language processing and/or classification machine learning frameworks, or any combination thereof, can be useful for several reasons:

Data Extraction: AI can help extract key financial data and information from dense and lengthy SEC filings, making it easier to analyze a company's financial health.

Summarization: It can summarize lengthy documents into concise reports, saving time for investors and analysts.

Trend Analysis: AI can identify trends and patterns over time from multiple filings, aiding in investment decision-making.

Compliance Checks: It can assist in ensuring that companies are complying with regulatory requirements.

Accessibility: Makes the information more accessible to the general public who may not have the expertise to understand complex financial documents.

However, at current stage, the AI models from some of the most prominent technology companies, including OpenAI, Meta, and Anthropic, are exceptionally bad at analyzing SEC filings and other financial documents. Frequently, these models either fail to respond to the given prompts, produce incorrect responses, or generate what is referred to as "hallucinations" in AI terminology.

In some embodiments, the operation of the present disclosure includes:

Step 1 (pipeline functionality): when the input document is exemplarily a financial filing, the data extraction pipeline can retrieve and/or generate following items:

Generate/Find/Download all extensible business reporting language (XBRL) tags for a given company filing with:
  a. Necessary Fields: tagName & Value,
  b. E.g. summaryOfSignificantAccountingPoliciesTextBlock & "The associated text would go here . . . "
Generate/Find/Download the actual document text—
  a. Essentially this is the raw text converted from the entire filing PDF.
Generate a list of all relevant tags for the filing/section being worked on—
  a. The tags can be found and easily accessed in the excel version of the Generally Accepted Accounting Principles (GAAP) taxonomy found on the Financial Accounting Standards Board (FASB) website: https://fasb.org/Page/PageContent?PageId=/xbrl/2023-gaap-financial-reporting-taxonomy.html.

With the above items, a goal of the exemplary process is to systematically create training messages. In some embodiments, the disclosed method generates three types of training messages:

Tag Identification:
  a. Given a large body of text from a 10K and a list of all possible tags that can be found here, identify tags that are present in this section.

Text Identification:
  a. Given a set of tags the exemplary process has identified associated text that are in the body of text, return the tag: text pairs.

Tag Learning:
  a. Tag learning messages are for training only, and are intended to give the Generative Pre-trained Transformer (GPT) model more context surrounding the tags. These messages are along the lines of "Define [tagName]", or "What data type is [tagName]". This would only be done in the training stage. A purpose of the tag learning messages is that it creates, based on the tags, a hierarchal model of the structure of the document to be tagged. A user does not need to enter these tags when using the model to tag the document. In some other embodiments, the user can provide tags during usage of the model. Usage in this way is to provide feedback to the model for updating thereof.

It is important to note that the GPT's output should only contain the target text. That is, if one wants a tag-text pair, it is better to return the pair in a dictionary form like "tag: text", rather than with the tag placed in line with the text. The GPT model is constrained through reinforcement learning/human feedback and through fine tuning (from ground truth data). By limiting the text the GPT is outputting to exactly what is desired, one can more accurately improve accuracy of the prediction, since the misclassifications in the tag-text pair case are far more difficult than if the tagging is done inline. The GPT model is constrained through reinforcement learning and/or human feedback and through fine tuning (from ground truth data).

Step 2 (creating the pipeline):
First, generate following data pieces: —A DataFrame containing the tags and values associated with the chunk of text—The larger chunk of text that contains these tags and values.
  a. This may prove to be difficult at first. The format of the XBRL data does not always match that found in the text (e.g., one may have 3.2% as a text when the XBRL fact is 0.032), so formatting and coming up with some regular expression matching is necessary to identify and match these values.
  b. Also note that for some values, there may be multiple instances within the text (e.g., when a XBRL fact is "2" for storesOperated, if searching for 2 in the text one may likely have numerous matches). This is the bulk of the difficulty encountered in training the model. In an example, the model will incrementally add more context to the inference. Consider the single number "2". It is impossible to tag this properly—is it the number of stores? The number of offices in Kansas? But if one increases the context, e.g., includes the paragraphs proceeding and/or succeeding the number "2", then precision will be increased. In another example, one may provide all possible candidate tags, and then have a separate ranking algorithm to identify likelihood based on hierarchical tags (only certain tags are reasonable for the section), other tags already populated, and position of the text in the document. When the above two exemplarily methods still do not provide distinguishable inferences, the system may create exceptions for a human operator to review and feedback.

Second, with the above, the followings may be generated:
a. Either one large body, or multiple smaller chunks of the text paired with the tags associated with the text.
  1. For this step, it may be beneficial at first to break up the large text into multiple smaller sections, and when model capability allows, expand to the full body of text and all the tags it contains. As an example, a GPT model may support 4,000 tokens of input/output inference. As the GPT model becomes more sophisticated, more text may be allowed to be used. However, predicting over a sub-section of the text can introduce risks related to context loss. Consider the single number "2". It is impossible to tag this properly—is it the number of stores? The number of offices in Kansas? But if you increase the context, e.g. include the paragraphs proceeding and/or succeeding the number "2", then precision will be increased.
  2. Depending on the context and format of the document, there are a few approaches to pair text with associated tags.
  3. If the document is structured (e.g., CSV, JSON), where each entry has specific tags associated with text, one can organize it like this:
    tag1, Some text here
    tag2, Another piece of text
    Or in JSON format:

```
{
  "tag1": "Some text here",
  "tag2": "Another piece of text"
}
```

4. If the document is in plain text and follows a consistent pattern, one can use delimiters (such as colons, semicolons, or tabs) to separate tags from text:
    tag1: Some text here
    tag2: Another piece of text
  5. If the document is in HTML or XML format, one can use the actual tags with the markup to associate text:

```
<tag1>Some text here</tag1>
<tag2>Another piece of text</tag2>
```
6. If none of the above formats fits the document, one can create a custom format that suits the need. For example:
   ```
   [tag1] Some text here [/tag1]
   [tag2] Another piece of text [/tag2]
   ```
b. Either one large body, or multiple smaller chunks of the text paired with the tag: text values contained within the text. Note that
   1. For this step, it may be beneficial at first to break up the large text into multiple smaller sections, and when model capability allows, expand to the full body of text and all the tag: text pairs it contains.
   2. The task of extracting text paired with specific tag: text values within a large body. One can achieve this using regular expressions (regex) or string manipulation techniques.
   3. In regex approach, if one has a large body of text and wants to extract specific tag: text pairs, one can use regex to find patterns that match a desired format. For example, if the text contains lines like: `<tag>Some text here</tag>`, one can use the following regex pattern to extract the tag and its associated text:
      `<(\w+)>(.*?)</\1>`
      Explanation:
      `<(\w+)>`: Matches an opening tag (e.g., `<tag>`), capturing the tag name.
      `(.*?)`: Captures the text content between the opening and closing tags.
      `</\1>`: Matches the corresponding closing tag (e.g., `</tag>`).
   4. In string manipulation approach, if the text is structured consistently (e.g., each tag: text pair is on a separate line), one can split the text into lines and then extract the relevant parts.

Third, with the above, the training messages may be created:
   a. Large text and tags found within the large text for the tag identification.
   b. Large text and the tag: text pairs found within the large text for the tag: text pair identification.

Fourth, the messages need to be formatted to appropriately be piped into ChatGPT as json1, which sometimes involves the elimination of certain characters found on the text, like apostrophes that aren't the same ASCII character as ', backslashes \, and the interplay of apostrophes '" in a large body of text.

Fifth, once formatted, split training validation (before adding in the tag training messages), upload the files to ChatGPT, and train the model. When working with machine learning models, one often needs to choose the best model from a set of candidates. To do this, one evaluates each model's performance using metrics such as mean squared error (MSE), root mean squared error (RMSE), accuracy, or log-loss. However, evaluating a model only once on a sample dataset may not provide a reliable assessment. Here is where the training-validation-test comes into play:

Training data: a user may initially fit the model on a training dataset which may be used to train the model's parameters.

Validation data: after training, the fitted model may be used to predict responses for observations in a second dataset called the validation dataset. This allows the user to evaluate the model's performance on unseen data.

Test data: finally, a separate test dataset that the model has never seen before. The user evaluates the model's performance on this test dataset to get an unbiased estimate of its generalization ability.

The split ratios between training, validation, and test data can vary. Common choices include an 80-10-10 split or a 70-15-15 split. The goal is to strike a balance: too little validation data may lead to overfitting, while too little training data may result in an underfit model.

Once the best model is selected based on validation performance, the model may be retrained using both the training and validation data. This ensures that the model benefits from the entire labeled dataset. The training-validation-test split helps the user make informed decisions about model selection and prevents overfitting.

In deployment according to some embodiments, the trained model may output both (i) tags within the whole document, and (ii) tag: text dictionaries.

In some embodiments, the present disclosure involves fine-tuning large language models for specific domain tags (for instance, training the model on XBRL), in coordination with the inputs and outputs.

In some other embodiments, the present disclosure may also employ other machine learning models as alternatives to the large language models. These machine learning models may include models like decision trees, support vector machines, or neural networks, depending on the specific requirements and constraints of the task at hand.

Figure 1:
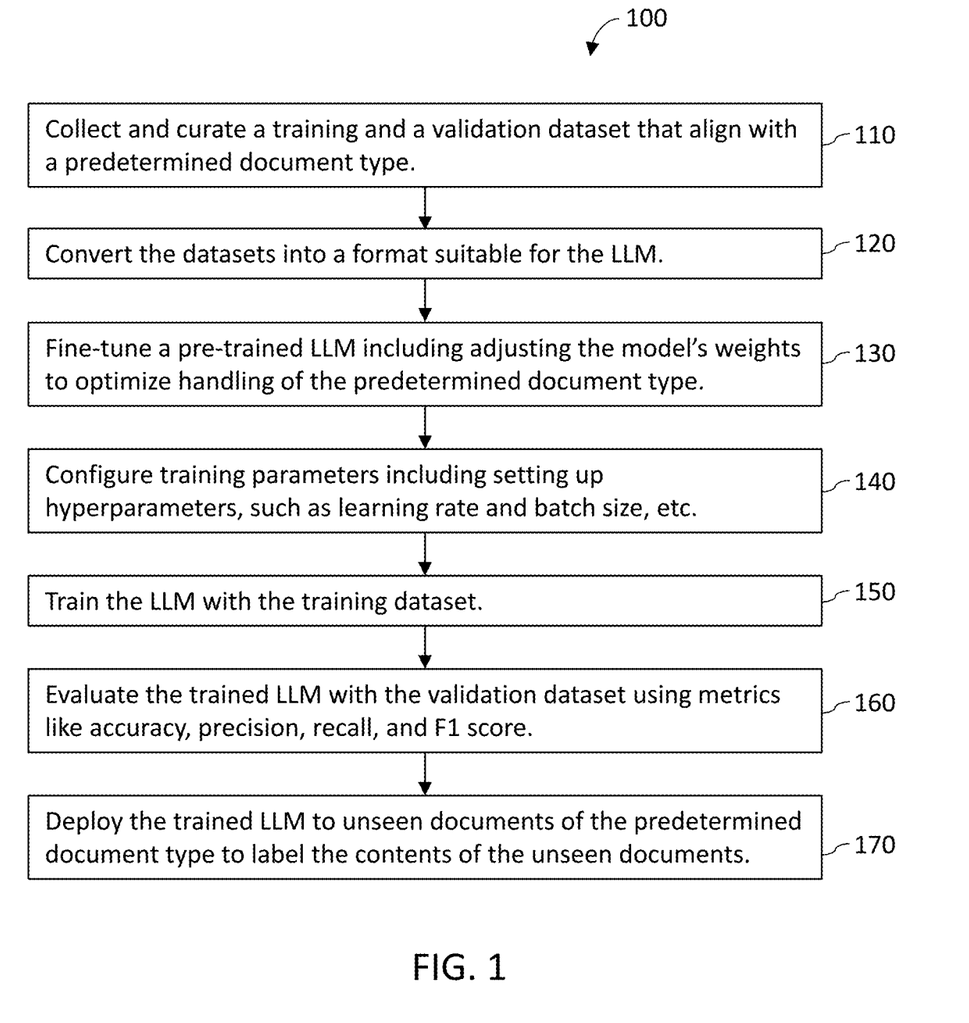
FIG. 1 is flowchart illustrating an exemplary AI model training process according to embodiments of the present disclosure.

FIG. 1 is flowchart illustrating an exemplary AI model training process 100, of which the above exemplary computer implemented method is an example, according to embodiments of the present disclosure. The exemplary process 100 includes at least blocks 110-170 which are described herein below.

In block 110, at least one computing device collects and curate a training and a validation dataset that align with a predetermined document type, such as SEC filings.

In block 120, the at least one computing device converts the training and validation datasets into a format suitable for a chosen AI model, such as a large language model (LLM).

In block 130, the at least one computing device fine-tunes a pre-trained AI model, such as an LLM. The fine-tune process includes adjusting the AI model's weights to optimize handling of the predetermined document type.

In block 140, the at least one computing device configures training parameters including setting up hyperparameters, such as learning rate and batch size, etc.

In block 150, the at least one computing device trains the AI model (such as the LLM) with the training dataset.

In block 160, the at least one computing device evaluates the trained AI model (such as the LLM) with the validation dataset using metrics like accuracy, precision, recall and F1 score.

In block 170, the at least one computing device deploys the trained AI model (such as the LLM) to unseen documents of the predetermined document type to label the contents of the unseen documents.

Figure 2:
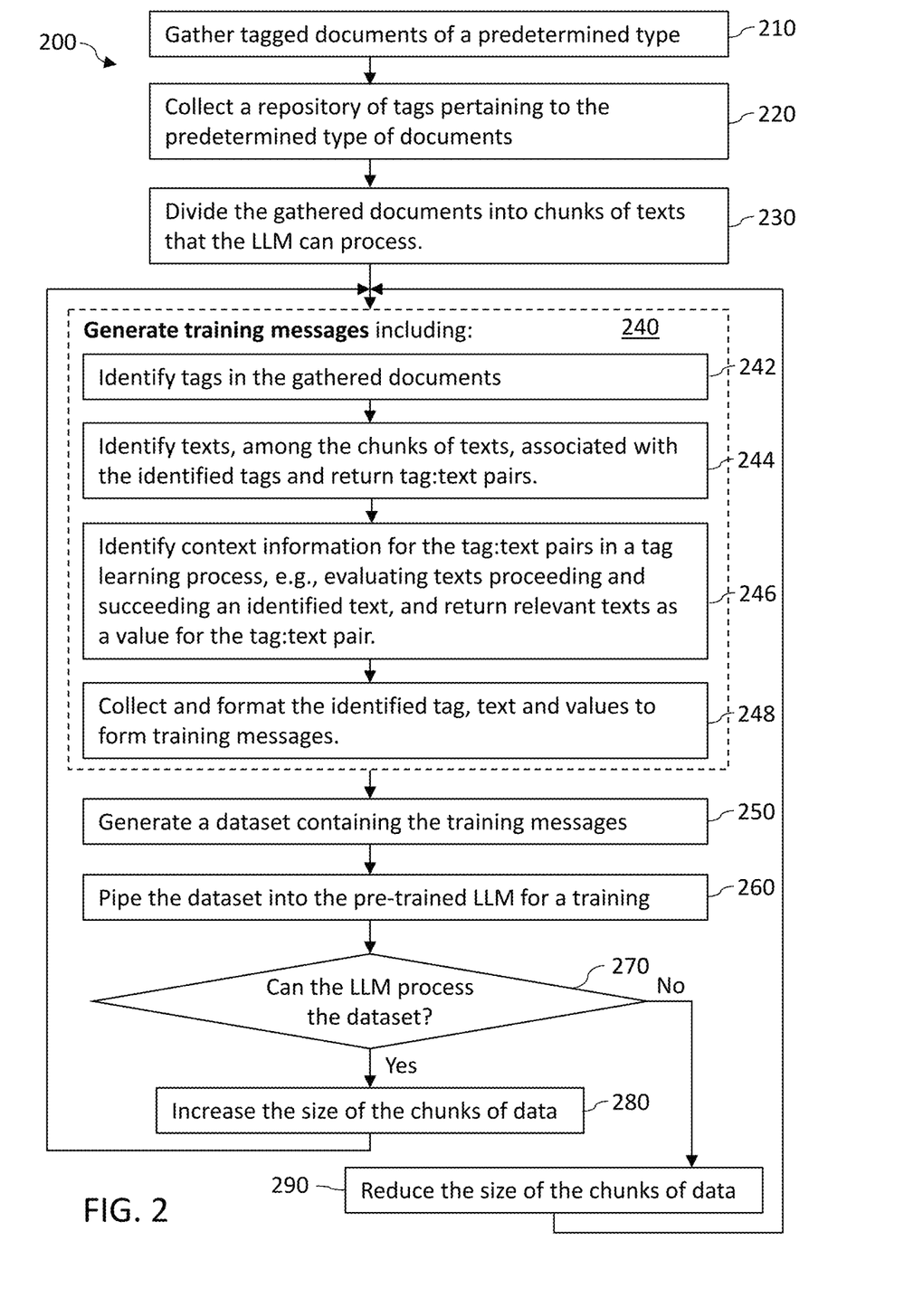
FIG. 2 is a flowchart illustrating another exemplary AI model training process according to embodiments of the present disclosure.

FIG. 2 is a flowchart illustrating another exemplary AI model training process 200, of which the above exemplary computer implemented method is an example, according to embodiments of the present disclosure. The exemplary process 200 includes at least blocks 210-290 which are described herein below.

In block 210, at least one computing device gathers existing tagged documents of a predetermined type.

In block 220, the at least one computing device collects a repository of tags pertaining to the predetermined type of documents. An example of the repository of tags may contain the extensible business reporting language (XBRL) tags.

In block 230, the at least one computing device divides the gathered documents into chunks of texts that a chosen LLM can process. In at least some embodiments, a gathered document, such as a SEC filing, typically has standard sections like the cover page, financial statements, management discussion, and analysis, the dividing process may first identify these sections to create logical chunks. Then the dividing process may further break down these sections into smaller chunks if needed, such as paragraphs and/or sentences. Each chunk may represent a meaningful piece of information.

In block 240, the at least one computing device generates training messages for training the LLM. Block 240 includes subblocks 242-248.

In subblock 242, the at least one computing device identifies tags in the gathered documents.

In subblock 244, the at least one computing device identify texts, among the chucks of texts, associated with the identified tags and return tag: text pairs.

In subblock 246, the at least one computing device identify context information for the tag: text pairs in a tag learning process. For example, the at least one computing device evaluates texts proceeding and succeeding an identified text, and return the relevant texts as a value for the tag: text pair.

In subblock 248, the at least one computing device collects and formats the identified tags, texts and values to form training messages.

In block 250, the at least one computing device generates a dataset containing the training messages formed in block 240.

In block 260, the at least one computing device pipes the dataset into the pre-trained LLM for training the same.

In block 270, the at least one computing device inspects if the LLM can process the dataset. In case the LLM cannot process the dataset, the at least one computing device reduces the size of the chunks of data in block 290. In case the LLM can process the dataset, the at least one computing device increase the size of the chunks of data in block 280.

After either block 280 or block 290, the process 200 returns to block 240 to generated new training messages to re-train the LLM until a satisfactory accuracy is achieved.

Figure 3:
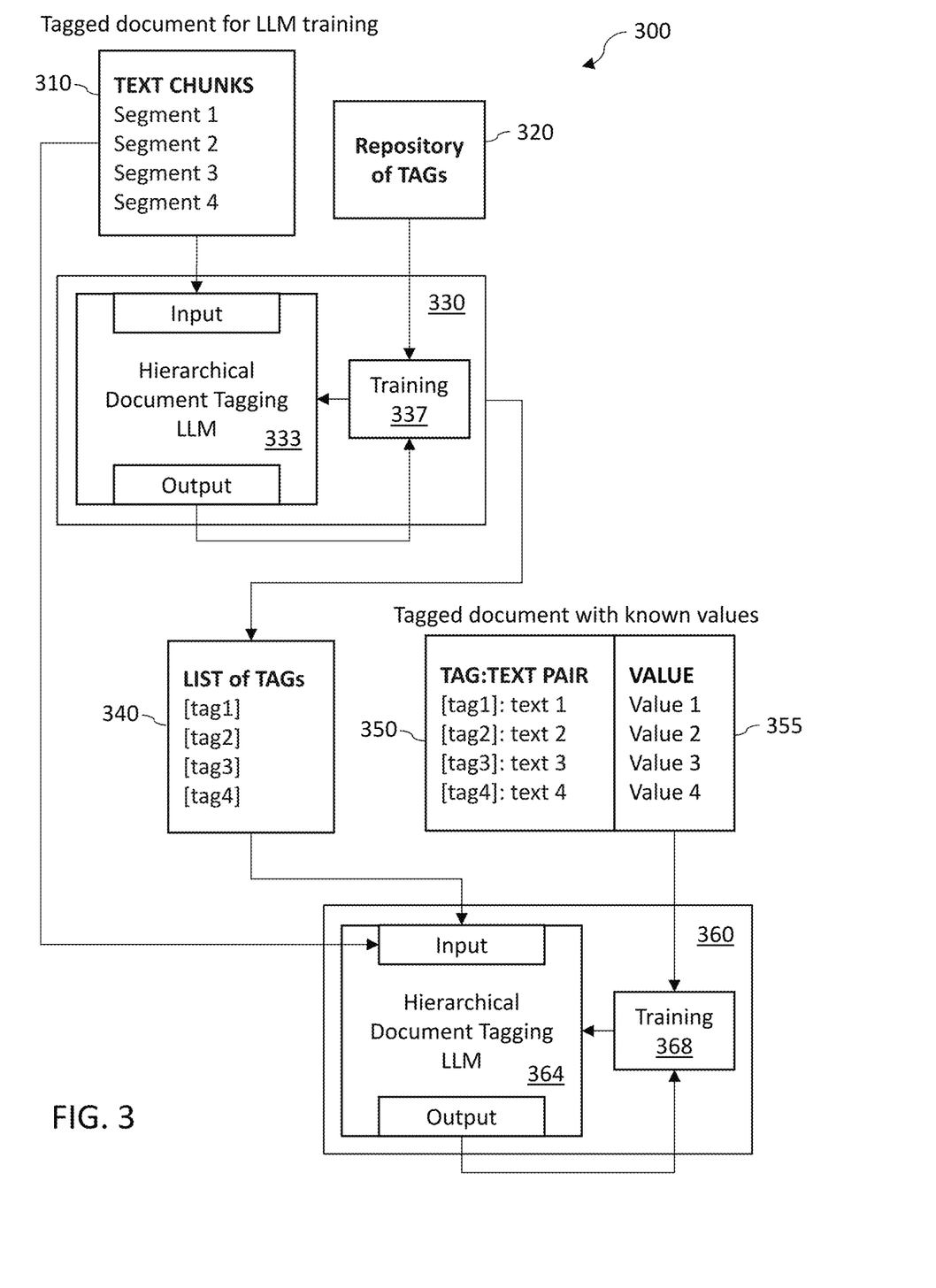
FIG. 3 is a block diagram illustrating an exemplary model training process according to embodiments of the present disclosure.

FIG. 3 is a block diagram illustrating an exemplary model training process 300, of which the above computer implemented method is an example, according to embodiments of the present disclosure. The process 300 may exemplarily begin with dividing a tagged document into text chunks (e.g., segments 1-4) in block 310. In some embodiments, the tagged document may include a document that is pre-tagged with known "ground truth" tags. For example, the tagged document may be accessed in a repository of prior tagged documents that have been tagged and/or verified by one or more human experts, filed with and accepted by one or more authorities associated with a type of the prior tagged documents (e.g., the US Security and Exchange Commission for financial disclosures such as 10K forms), or other documents having known accurate tagging.

The text chunks along with a repository of tags shown as block 320 may then be fed into a first AI model 330 to generate a list of tags (e.g., tag1-tag4). In some embodiments, the list of tags may be provided by human annotation, verification of auto-generated tags, or other form of producing a ground truth set of tags applicable to the text chunk 310. In at least some embodiments, the AI model 330 may include a first hierarchical document tagging large language model (LLM) 333 and a training module 337.

In some embodiments, the parameters of the first hierarchical document tagging LLM 333 may be trained based on known outputs. For example, the text of the text chunk 310 may be paired with a list of known tag to form a training pair. In some embodiments, the text may be provided to the first hierarchical document tagging LLM 333, e.g., encoded in a feature vector, to produce a predicted list of tags 340 predicted to be applicable to the text chunk 310 and thereby predict one or more labels for the text chunk 310. In some embodiments, the first hierarchical document tagging LLM 333 may be configured to generate the list of predicted tags, predict a matching of the text chunk 310 to one or more tags in the repository of tags 320, or any combination thereof.

In some embodiments, the first training module 337 associated with the first hierarchical document tagging LLM 333 may then compare the predicted label(s) with the known tag(s) to determine an error of the predicted label(s). In some embodiments, the first training module 337 may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, based on the error, the first training module 337 may update the parameters of the first hierarchical document tagging LLM 333 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique.

In at least some embodiments, hierarchical document tagging using LLMs is a method for organizing and classifying documents into a structured taxonomy to improve hierarchical text classification with minimal supervision. LLMs can be used for both data annotation and creation tailored for the hierarchical label space. An output of the hierarchical document tagging LLM 333 along with the repository of tags 320 may be provided to the training module 337 to train the AI model 330.

Referring again to FIG. 3, the list of tags (e.g., tag1-tag4) 340 and the text chunks 310 may be provided to a second hierarchical document tagging LLM 364 of a second AI model 360 to generate a plurality of tag: text pairs. For example, tag1 may be paired with text 1; tag2 may be paired with text 2; tag3 may be paired with text 3; and tag4 may be paired with text 4. The tag: text pairs may then be outputted to a second training module 368. The tagged document with known values for the tag: text pairs may also be provided to the second training module for training the second AI model 364.

The text: tag pairing process may exemplarily start by extracting texts from a given document, and determine logical sections of the document. The logical sections are then broken down into smaller chunks with each chunk representing a meaningful piece of information. Next, a tag may be assigned to each chunk. The assigned tag should be descriptive and relevant to the content of the chunk.

For example, a document may be broken down into smaller exemplary chunks:

Cover Page:
   Company Name: XYZ Corp
   Filing Date: 2024 Sep. 3
Financial Statements:
   Balance Sheet:
   Assets: $1,000,000
   Liabilities: $500,000
Management Discussion:
   Overview:
   The company experienced a 10% growth in revenue . . .

Each chunk is tagged with a relevant label and saved in JSON format:

```
[
    {
        "tag": "Cover Page",
        "text": "Company Name: XYZ Corp\nFiling Date: 2024-09-03"
    },
    {
        "tag": "Financial Statements",
        "text": "Balance Sheet:\nAssets: $1,000,000\nLiabilities: $500,000"
    },
    {
        "tag": "Management Discussion",
        "text": "Overview:\nThe company experienced a 10% growth in revenue..."
    }
]
```

In at least some embodiments, the text: tag pairing process may also include a feedback loop where matching of the assigned tags with content of the corresponding texts are checked against a predetermined threshold. In some embodiments, the predetermined threshold may be established from past trainings. If a mismatch is found, the tag will be corrected or a different tag be assigned to better reflect of text. Implementing the feedback look helps in continuously improving the tagging process.

In at least some embodiments, the text: tag pairing process may also include consistency checking to ensure that similar content may be tagged uniformly across different documents. If an inconsistency is found, the text: tag pairing process may run each of the inconsistent text: tag pairs through the above match checking process to identify a better match among the inconsistent text: tag pairs, and make sure that the better match meets the predetermined threshold. Then the better matched tag may be assigned to every one of the texts with similar contents.

In some embodiments, the parameters of the second hierarchical document tagging LLM 364 may be trained based on known outputs. For example, the text of each text: tag pair may be paired with a known tag to form a training pair. In some embodiments, the text may be provided to the second hierarchical document tagging LLM 364, e.g., encoded in a feature vector, to produce a match to one of the tags in the list of tags 340 and thereby predict a label for the text string. In some embodiments, the second training module 368 associated with the second hierarchical document tagging LLM 364 may then compare the predicted label with the known tag to determine an error of the predicted label. In some embodiments, the second training module 368 may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, based on the error, the second training module 368 may update the parameters of the second hierarchical document tagging LLM 364 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique.

In at least some embodiments, the training process 300 may be exemplarily implemented by the process 100 shown in FIG. 1 and/or process 200 shown in FIG. 2. In addition, the training process 300 may iterate multiple time with multiple tagged documents to improve accuracy of the AI models 330 and 360.

Figure 4:
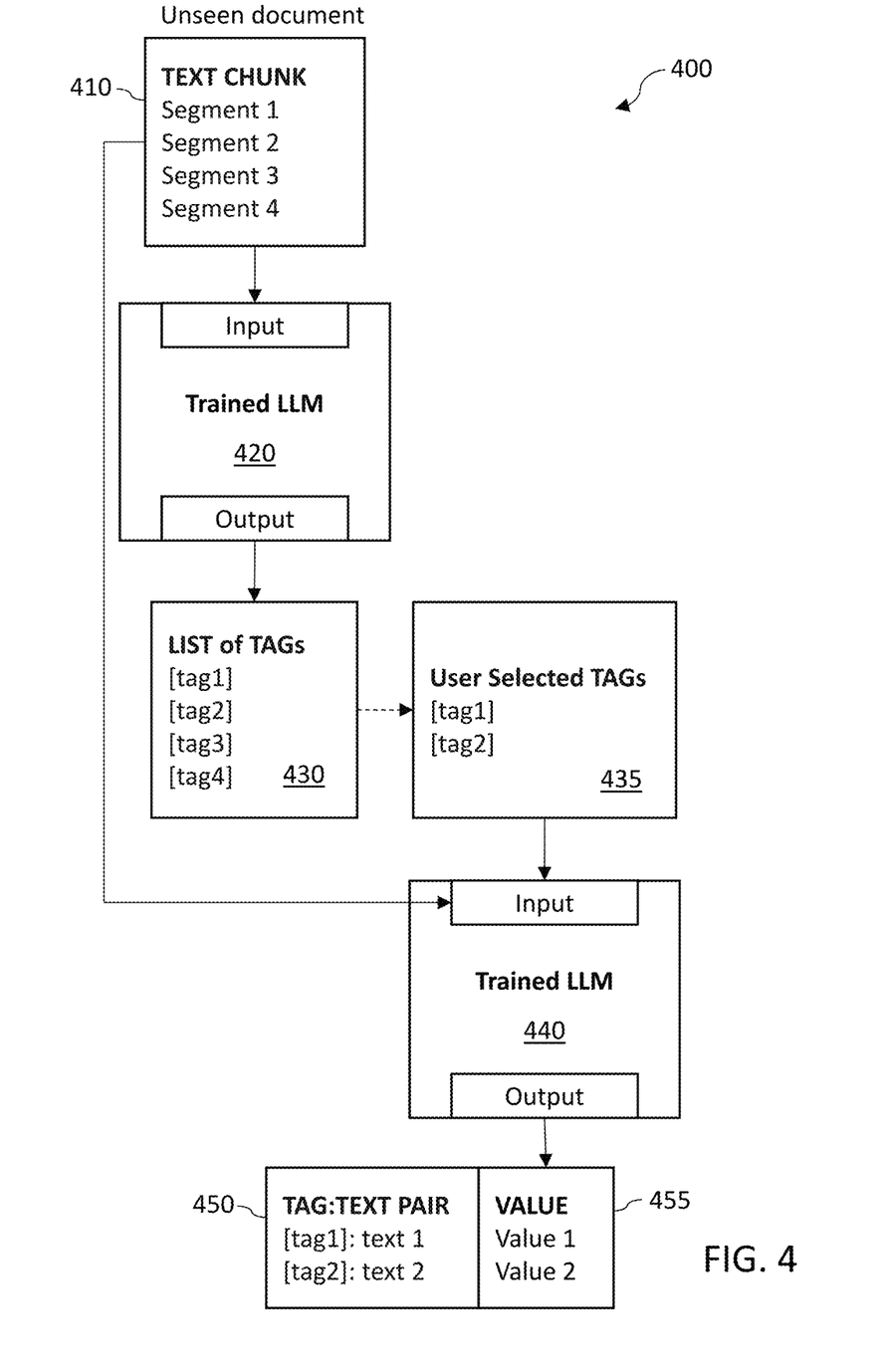
FIG. 4 is a block diagram illustrating an exemplary AI model inferencing process according to embodiments of the present disclosure.

FIG. 4 is a block diagram illustrating an exemplary AI model inferencing process 400 based on any one or more of the above exemplary AI training processes and/or the exemplary computer implemented method according to embodiments of the present disclosure. The exemplary process 400 may begin with dividing an unseen document of the predetermined type into multiple text chunks (e.g., Segments 1-4) in block 410. The text chunks may then be inputted in a first trained LLM 420 to generate a list of tags (e.g., tag1-4) of block 430. The first trained LLM 420 may be trained in process 300 from LLM 333 shown in FIG. 3.

Referring again to FIG. 4, a user may select some particular tags (e.g., tag1 and tag2) of interest in block 435 from the list of tags of block 430. The selected tags along with the unseen document may be inputted into a second trained LLM 440 to generate tag: text pairs (e.g., [tag1]:text 1 and [tag2]:text 2) in block 450 and corresponding values (e.g., value 1 for [tag1]:text 1 pair and value 2 for [tag2]:text 2 pair) in block 455. The second trained LLM 440 may be trained in process 300 from LLM 364 shown in FIG. 3.

Figure 5:
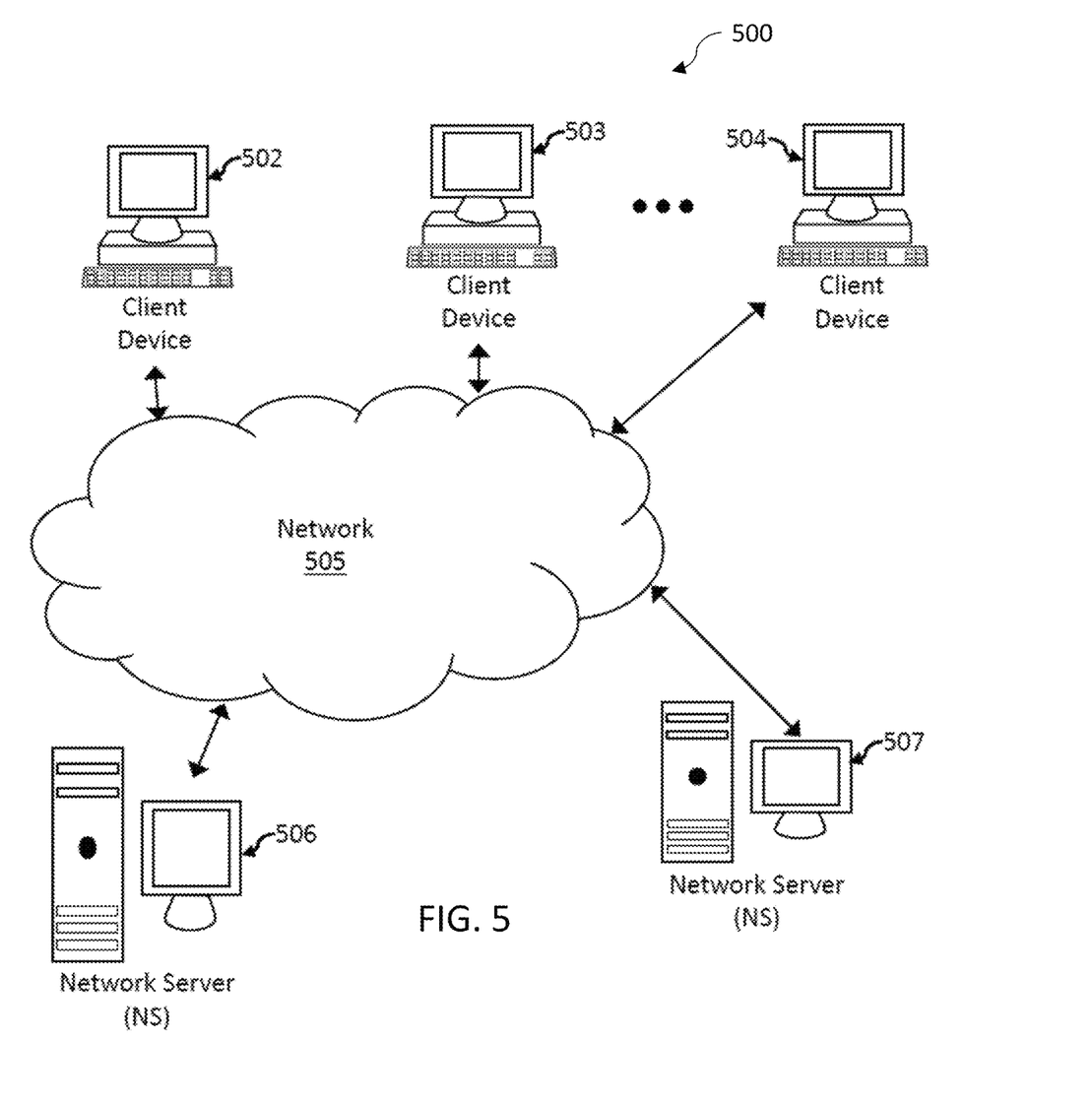
FIG. 5 depicts a block diagram of an exemplary computer-based system and platform in accordance with one or more embodiments of the present disclosure.

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, client device 502, client device 503 through client device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the client devices 502 through 504 may be personal computers, multiprocessor systems, microprocessor-based or programmable consumer electronics, network PCs, and the like. In some embodiments, one or more client devices within client devices 502 through 504 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more client devices within client devices 502 through 504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 502 through 504 may include may run one or more applications, such as Internet browsers, mobile applications, voice calls, video games, videoconferencing, and email, among others. In some embodiments, one or more client devices within client devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 502 through 504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 502 through 504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 502 through 504.

In some embodiments and, optionally, in combination of any embodiment described above or below, for example, one or more exemplary computing client devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 6:
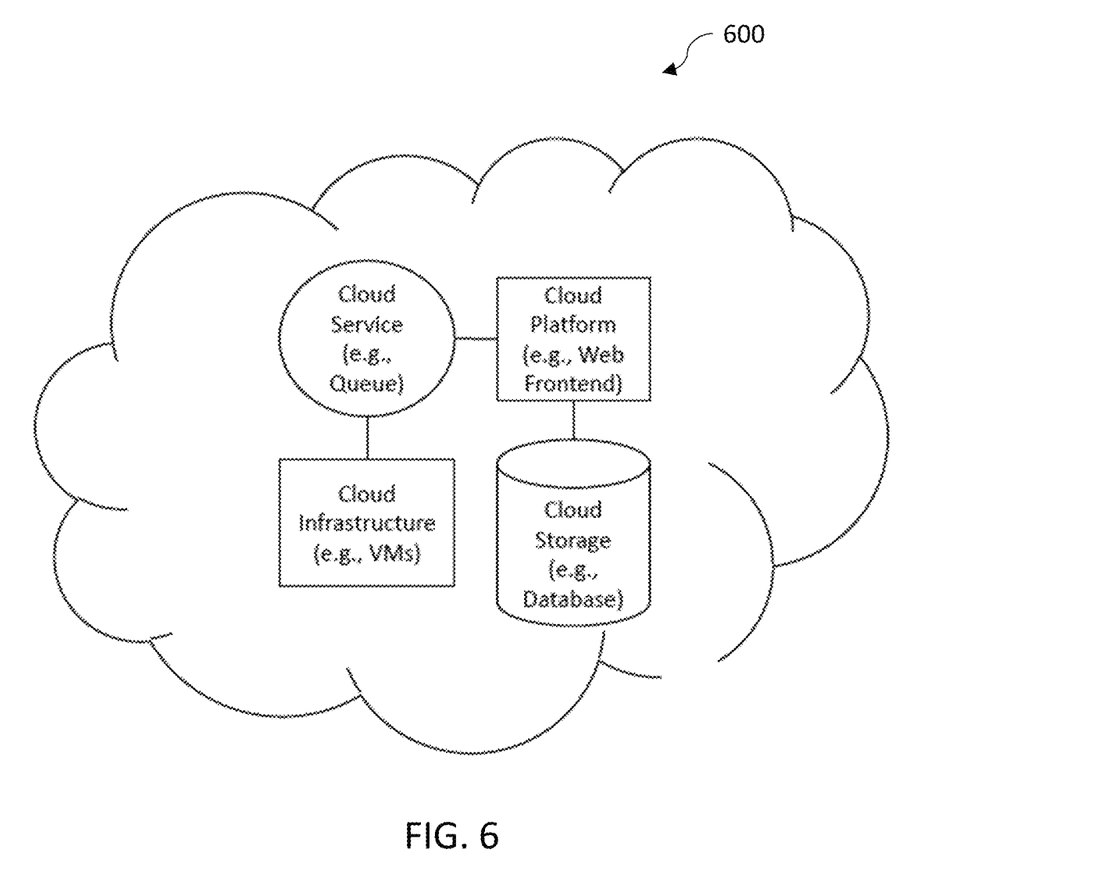
FIG. 6 depicts illustrative schematics of an exemplary implementation of the cloud computing/architecture(s) in which embodiments of a system for AI model training and inferencing may be specifically configured to operate in accordance with some embodiments of the present disclosure.

FIG. 6 depicts illustrative schematics of an exemplary implementation of the cloud computing/architecture(s) in which embodiments of a system for AI model training and inferencing may be specifically configured to operate in accordance with some embodiments of the present disclosure. In at least some embodiments, the LLM models resides in the cloud computing system, while the training datasets may be generated in a local computing system and transmitted to the cloud computing system via the Internet. In at least some embodiments, the cloud computing system may be implemented by the network server 506 and/or 507 shown in FIG. 5, while the local computing system may be implemented by the client device 502, 503 and/or 504.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data items, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24).NET Framework; (25) Silverlight™; (26) Open Web Platform; (27) Oracle Database; (28) Qt™; (29) SAP NetWeaver™; (30)

Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method, including: training, by at least one computing device, a first and a second pre-trained large language model (LLM), the training including: gathering, by the at least one computing device, at least one tagged document of a predetermined type; dividing, by the at least one computing device, the gathered tagged documents to one or more chunks of texts of a first predetermined size; collecting, by the at least one computing device, a repository of tags pertaining to the predetermined type of document; providing, by the at least one computing device, the at least one tagged document and the repository of tags to train the first pre-trained LLM; identifying, by the at least one computing device, at least a first tag in the gathered document; pairing, by the at least one computing device, at least one text, among the one or more chunks of texts, with the identified first tag; identifying, by the at least one computing device, at least one value associated with the paired first tag and the at least one text from context information of the paired at least one text; formatting, by the at least one computing device, the paired first tag and the at least one text and the associated at least one value to form at least one training message; generating, by the at least one computing device, at least one dataset containing the at least one training message; providing, by the at least one computing device, the at least one dataset to train the second pre-trained LLM; evaluating, by the at least one computing device, at least one training result of the first and second pre-trained LLM; and changing, by the at least one computing device, a size of chucks of texts to a second predetermined size in response to a result of evaluating the training of the first and second pre-trained LLM; iterating, by the at least one computing device, the training of the first and second pre-trained LLM with the second predetermined size to obtain a first and second trained LLM; providing, by the at least one computing device, an unseen document of the predetermined type to the first trained LLM; generating, by the at least one computing device via executing the first trained LLM, a list of tags from the unseen document; selecting, by the at least one computing device, at least a second tag from the list of tags; providing, by the at least one computing device, the second tag and the unseen document to the second trained LLM; and identifying, by the at least one computing device via executing the second trained LLM, at least one unseen text paired with the second tag and a value associated with the paired second tag and the at least one unseen text.

Clause 2. The method of clause 1, wherein the predetermined type is a financial report.

Clause 3. The method of clause 2, wherein the repository of tags is at least a part of extensible business reporting language (XBRL) tags.

Clause 4. The method of clause 1, wherein the first and second pre-trained LLM reside in a cloud computing system.

Clause 5. The method of clause 4, wherein the at least one dataset is transmitted to the cloud computing system from a local computing system via internet.

Clause 6. The method of clause 1, wherein the second predetermined size is larger than the first predetermined size.

Clause 7. The method of clause 1, further including adjusting, by the at least one computing device, weights of the first and second pre-trained LLM to optimize handling of the predetermined document type.

Clause 8. The method of clause 1, wherein the paired at least one text contains at least a third tag.

Clause 9. The method of clause 1, further including outputting, by the at least one computing device, the paired second tag and the at least one unseen text in a dictionary form.

Clause 10. A method, including: training, by at least one computing device, a first and a second pre-trained large language model (LLM), the training including: gathering, by the at least one computing device, at least one tagged document of a predetermined type; dividing, by the at least one computing device, the gathered tagged documents to one or more chunks of texts of a first predetermined size; collecting, by the at least one computing device, a repository of tags pertaining to the predetermined type of document; providing, by the at least one computing device, the at least one tagged document and the repository of tags to train the first pre-trained LLM; identifying, by the at least one computing device, at least a first tag in the gathered document; pairing, by the at least one computing device, at least one text, among the one or more chunks of texts, with the identified first tag; identifying, by the at least one computing device, at least one value associated with the paired first tag and the at least one text from context information of the paired at least one text; formatting, by the at least one computing device, the paired first tag and the at least one text and the associated at least one value to form at least one training message; generating, by the at least one computing device, at least one dataset containing the at least one training message; providing, by the at least one computing device, the at least one dataset to train the second pre-trained LLM; evaluating, by the at least one computing device, at least one training result of the first and second pre-trained LLM; and changing, by the at least one computing device, a size of chucks of texts to a second predetermined size in response to a result of evaluating the training of the first and second pre-trained LLM; iterating, by the at least one computing device, the training of the first and second pre-trained LLM with the second predetermined size to obtain a first and second trained LLM; providing, by the at least one computing device, an unseen document of the predetermined type to the first trained LLM; generating, by the at least one computing device via executing the first trained LLM, a list of tags from the unseen document; selecting, by the at least one computing device, at least a second tag from the list of tags; providing, by the at least one computing device, the second tag and the unseen document to the second trained LLM; identifying, by the at least one computing device via executing the second trained LLM, at least one unseen text paired with the second tag and a value associated with the paired second tag and the at least one unseen text; and outputting, by the at least one computing device, the paired second tag and the at least one unseen text in a dictionary form.

Clause 11. The method of clause 10, wherein the predetermined type is a financial report.

Clause 12. The method of clause 11, wherein the repository of tags is at least a part of extensible business reporting language (XBRL) tags.

Clause 13. The method of clause 10, wherein the first and second pre-trained LLM reside in a cloud computing system.

Clause 14. The method of clause 13, wherein the at least one dataset is transmitted to the cloud computing system from a local computing system via internet.

Clause 15. The method of clause 10, wherein the second predetermined size is larger than the first predetermined size.

Clause 16. The method of clause 10, further including adjusting, by the at least one computing device, weights of the first and second pre-trained LLM to optimize handling of the predetermined document type.

Clause 17. The method of clause 10, wherein the paired at least one text contains at least a third tag.

Clause 18. A system including: one or more processors; and a memory in communication with the one or more processors and storing instructions that, when executed by the one or more processors, cause the one or more processors to: train a first and a second pre-trained large language model (LLM), the training including: gathering at least one tagged document of a predetermined type; dividing the gathered tagged documents to one or more chunks of texts of a first predetermined size; collecting a repository of tags pertaining to the predetermined type of document; providing the at least one tagged document and the repository of tags to train the first pre-trained LLM; identifying at least a first tag in the gathered document; pairing at least one text, among the one or more chunks of texts, with the identified first tag; identifying at least one value associated with the paired first tag and the at least one text from context information of the paired at least one text; formatting the paired first tag and the at least one text and the associated at least one value to form at least one training message; generating at least one dataset containing the at least one training message; providing the at least one dataset to train the second pre-trained LLM; evaluating at least one training result of the first and second pre-trained LLM; and changing a size of chucks of texts to a second predetermined size in response to a result of evaluating the training of the first and second pre-trained LLM; iterate the training of the first and second pre-trained LLM with the second predetermined size to obtain a first and second trained LLM; provide an unseen document of the predetermined type to the first trained LLM; generate, via executing the first trained LLM, a list of tags from the unseen document; select at least a second tag from the list of tags; provide the second tag and the unseen document to the second trained LLM; and identify, via executing the second trained LLM, at least one unseen text paired with the second tag and a value associated with the paired second tag and the at least one unseen text.

Clause 19. The system of clause 18, wherein the first and second pre-trained LLM reside in a cloud computing system.

Clause 20. The system of clause 19, wherein the at least one dataset is transmitted to the cloud computing system from a local computing system via internet.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method, comprising:
    training, by at least one computing device, at least one pre-trained large language model (LLM), the training comprising:
        obtaining, by the at least one computing device, at least one tagged document of a predetermined type;
        extracting, by the at least one computing device, from the at least one tagged document, one or more chunks of texts of a first predetermined size, each chunk of text being a portion of the at least one tagged document;
        determining, by the at least one computing device, for each chunk of text, a set of tags pertaining to the predetermined type of document;
            wherein each tag in the set of tags is associated with a respective text segment;
        identifying, by the at least one computing device, for each tag in the set of tags, at least one value in the respective segment of text and associated with each tag in the set of tags;
        generating, by the at least one computing device, a plurality of first training pairs comprising a plurality of tag: text pairs based on the identified at least one text associated with each tag;
        identifying, by the at least one computing device, context information, among the chunks of texts, associated with each of the plurality of tag: text pairs;
        generating, by the at least one computing device, a plurality of second training pairs, each second training pair comprising:
            a respective tag: text pair of the plurality of tag: text pairs, and
            a respective context information;
        transforming, by the at least one computing device, the plurality of first training pairs and the plurality of second training pairs to form a plurality of training messages;
        producing, by the at least one computing device, in the at least one pre-trained LLM, at least one hierarchical run time using the plurality of training messages to produce at least one hierarchical document tagging (HDT) LLM by iteratively:
            providing at least one first training message comprising the plurality of first training pairs to train the at least one pre-trained LLM, and
            providing at least one second training message comprising the plurality of second training pairs to train the at least one pre-trained LLM;
    providing, by the at least one computing device, the at least one HDT LLM, configured to utilize the at least one hierarchical run time with an unseen document of the predetermined type to output a list of tags from the unseen document and at least one value associated with each tag of in the list of tags, the at least one value of each tag being determined from an associated segment of text of the unseen document.

2. The method of claim 1, wherein the predetermined type is a financial report.

3. The method of claim 2, wherein the set of tags is at least a part of extensible business reporting language (XBRL) tags.

4. The method of claim 1, wherein the at least one HDT LLM reside in a cloud computing system.

5. The method of claim 4, wherein the at least one tagged document is transmitted to the cloud computing system from a local computing system via internet.

6. The method of claim 1, wherein the at least one chunk of text is larger than the at least one segment of text.

7. The method of claim 1, further comprising adjusting, by the at least one computing device, weights of the at least one HDT LLM to optimize handling of the predetermined document type.

8. The method of claim 1, wherein the paired at least one text contains at least a third tag.

9. The method of claim 1, further comprising outputting, by the at least one computing device, each tag of the list of tags and the at least one value associated with each tag in a dictionary form.

10. A method, comprising:
obtaining, by at least one computing device, at least one trained hierarchical document tagging (HDT) large language model (LLM) comprising at least one hierarchical run time that provide dynamic mappings amongst hierarchical tags for tagging values in documents of a predetermined type;
providing, by the at least one computing device, an unseen document of the predetermined type to the at least one trained HDT LLM, wherein the at least one hierarchical run time of the at least one trained HDT LLM is configured to:
generate a list of tags associated with at least one chunk of text in the unseen document;
based on the at least one hierarchical run time, for each tag in the list of tags:
select a tag from the list of tags; and
identify at least one segment of text within the at least one chunk of text associated with the tag; and
outputting, by the at least one computing device, each tag of the list of tags paired with and the at least one segment of text associated with each tag.

11. The method of claim 10, wherein the tags are at least a part of extensible business reporting language (XBRL) tags.

12. The method of claim 10, wherein the at least one HDT LLM resides in a cloud computing system.

13. The method of claim 12, wherein the unseen document is transmitted to the cloud computing system from a local computing system via internet.

14. The method of claim 10, wherein the at least one chunk of text is larger than the at least one segment of text.

15. The method of claim 10, further comprising adjusting, by the at least one computing device, weights of the at least one HDT LLM to optimize handling of the predetermined document type.

16. The method of claim 10, wherein the paired at least one text contains at least a third tag.

17. A system comprising:
one or more processors; and
a memory in communication with the one or more processors and storing instructions that, when executed by the one or more processors, cause the one or more processors to:
train at least one pre-trained large language model (LLM), the training comprising:
obtaining at least one tagged document of a predetermined type;
extracting, from the at least one tagged document, one or more chunks of text of a first predetermined size, each chunk of text being a portion of the at least one tagged document;
determining, for each chunk of text, a set of tags pertaining to the predetermined type of document;
wherein each tag in the set of tags is associated with a respective text segment;
identify, for each tag in the set of tags, at least one value in the respective segment of text and associated with each tag in the set of tags;
generate a plurality of first training pairs comprising a plurality of tag: text pairs based on the identified at least one text associated with each tag;
identify context information, among the chunks of texts, associated with each of the plurality of tag: text pairs;
generate a plurality of second training pairs, each second training pair comprising:
a respective tag: text pair of the plurality of tag: text pairs, and
a respective context information;
transform the plurality of first training pairs and the plurality of second training pairs to form at least one training message;
produce, in the at least one pre-trained LLM, at least one hierarchical run time using the plurality of training messages to produce at least one hierarchical document tagging (HDT) LLM by iteratively:
providing at least one first training message comprising the plurality of first training pairs to train the at least one pre-trained LLM;
providing at least one second training message comprising the plurality of second training pairs to train the at least one pre-trained LLM;
provide the at least one HDT LLM, configured to utilize the hierarchical run time with an unseen document of the predetermined type to output a list of tags from the unseen document and at least one value associated with each tag of in the list of tags, the at least one value of each tag being determined from an associated segment of text of the unseen document.

18. The system of claim 17, wherein the HDT LLM resides in a cloud computing system.

19. The system of claim 18, wherein the unseen document is transmitted to the cloud computing system from a local computing system via internet.

* * * * *